United States Patent
Harris (10) Patent No.: US 10,091,950 B2
(45) Date of Patent: Oct. 9, 2018

(54) MODULAR GARDEN PLANTER BED STRUCTURE

(71) Applicant: Vegepod Pty Ltd., Sydney (AU)

(72) Inventor: Matthew Harris, Narrabeen (AU)

(73) Assignee: Vegepod Pty Ltd., Sydney (AU)

( * ) Notice: Subject to any disclaimer, the term of this patent is extended or adjusted under 35 U.S.C. 154(b) by 195 days.

(21) Appl. No.: 14/223,161

(22) Filed: Mar. 24, 2014

(65) Prior Publication Data
US 2014/0283448 A1    Sep. 25, 2014

(30) Foreign Application Priority Data
Mar. 22, 2013  (AU) ................. 2013100358

(51) Int. Cl.
*A01G 9/02* (2018.01)
*A01G 9/20* (2006.01)

(52) U.S. Cl.
CPC ............. *A01G 9/02* (2013.01); *A01G 9/20* (2013.01); *Y10T 29/49448* (2015.01)

(58) Field of Classification Search
CPC .. A01G 13/0206; A01G 9/104; A01G 9/1066; A01G 9/027; A01G 9/022; A01G 9/023; A01G 9/025; A01G 9/20; A01G 9/02; Y10T 29/49448
USPC ..... 47/18, 19.1, 19.2, 20.1, 21.1, 29.5, 29.6, 47/30, 33, 66.6
See application file for complete search history.

(56) References Cited

U.S. PATENT DOCUMENTS

| | | | | |
|---|---|---|---|---|
| 4,058,930 A * | 11/1977 | Miles | ............... | A01G 9/02 47/58.1 R |
| 4,313,650 A * | 2/1982 | Ward | ............... | A01G 9/222 160/166.1 |
| 5,161,709 A * | 11/1992 | Oestreich, Jr. | ......... | B65D 19/12 220/1.5 |
| 5,187,894 A * | 2/1993 | Ripley, Sr. | ............ | A63C 19/00 47/59 R |
| RE35,006 E * | 8/1995 | Ripley, Sr. | ............ | A63C 19/00 47/59 R |
| 5,467,555 A * | 11/1995 | Ripley, Sr. | ............ | E01C 13/083 220/7 |
| 5,595,021 A * | 1/1997 | Ripley, Sr. | ............ | E01C 13/083 47/65.9 |
| 6,434,882 B1 * | 8/2002 | Becker | .............. | A01G 9/20 47/19.1 |
| 7,900,397 B2 * | 3/2011 | Mischo | .............. | A01G 1/007 47/65.9 |
| 8,122,682 B2 * | 2/2012 | Mischo | .............. | E04D 7/005 47/66.1 |
| 2010/0313474 A1 * | 12/2010 | Williams | ............ | A01G 9/023 47/65.7 |
| 2011/0067325 A1 * | 3/2011 | Modica | .............. | A01G 9/027 52/173.1 |
| 2011/0232174 A1 * | 9/2011 | Mills | .............. | A01G 9/20 47/20.1 |

(Continued)

*Primary Examiner* — Joshua Daniel Huson
(74) *Attorney, Agent, or Firm* — Alston & Bird LLP (57) ABSTRACT

The present invention relates to a modular structure for provision of a raised garden planter bed. The structure includes at least first and second receptacles adapted to be juxtaposed and connecting means adapted to bind the juxtaposed receptacles together. The present invention also relates to a kit of parts and a method for building the modular structure.

21 Claims, 9 Drawing Sheets

(56) References Cited

U.S. PATENT DOCUMENTS

2012/0266537 A1\* 10/2012 MacKenzie ........... E04D 11/002
                                                    47/86

\* cited by examiner

MODULAR GARDEN PLANTER BED STRUCTURE

CROSS-REFERENCE TO RELATED APPLICATION

This application claims priority to and the benefit of Australian Patent Application No. 2013100358, filed Mar. 22, 2013, which is hereby incorporated by reference in its entirety.

BACKGROUND

Technical Field

The present invention broadly relates to a structure, kit and method for providing a raised garden planter bed and in particular to a modular structure and/or a kit for the provision of a raised garden bed suitable for use in a backyard or other setting.

Description of Related Art

Various attempts have been made to grow fruits and vegetables in backyards including the use of raised garden beds. Conventional raised garden beds involve the use of bricks, timber sleepers or edgings to create the frame for the raised bed. It is however generally recognised that these garden beds provide only minimal improvement on traditional vegetable patches, which is less than desirable.

It is generally recognised that containerised gardens provide the most efficient way for growing plants and vegetables as soil control can be faultlessly managed but these are severely limited in their sizes.

Despite being able to provide some improvement in soil control and a small barrier to some wildlife, traditional raised garden beds let the majority of amateur gardeners down leaving them miserable, not only due to natural causes including weather variation, pests, bugs, vermin and wildlife invasions, but also soil deterioration and contamination as a result of being in contact with the ground.

Traditional raised garden beds also have the disadvantages of not being suitable for decks, small courtyards and hard surfaces, as soil leaching can cause staining and water can decay timber structures.

Moreover, important to growing success is the need for a garden cover that makes plants and vegetables easily accessible whilst providing appropriate protection from inclement weather, wildlife and vermin and pests and bugs. Traditional garden covers and the like have the shortcoming of making access to plants extremely difficult after installation. They usually have to be removed entirely by the user to gain access or only provide access through a small flap opening which severely restricts access to mature plants located at the opposite end of the raised garden beds. These traditional covers are predominantly made from a transparent PVC plastic which has the disadvantage of being only suitable for colder climates and cool days. Plants are prone to perishing if left unattended inside these enclosures when temperatures exceed 25° C.

It is an object of the present invention to provide a modular structure which may overcome or at least ameliorate the above disadvantage and shortcoming or which will at least provide a useful alternative.

BRIEF SUMMARY

According to one aspect of the present invention there is provided a modular structure for provision of a raised garden planter bed, the structure including: at least first and second receptacles adapted to be juxtaposed; and connecting means adapted to bind the juxtaposed receptacles together.

In various embodiments, each receptacle is a topless enclosure having a mouth defined by a rim. The rim may include a circumferential lip. In at least one embodiment, the rim includes four sides.

Each receptacle may be a self-contained module adapted to provide a miniature raised garden planter bed. Preferably, each receptacle includes a tray adapted to allow water recycling.

In at least one embodiment, the connecting means is in the form of a C-shaped channel having two arms. In use, one arm of the channel is preferred to engage one side of the rim of the first receptacle while the other arm engages a corresponding side of the rim of the second receptacle.

In an alternative embodiment, the connecting means includes holes provided along opposite sides of the rim of each receptacle and joiners each having a pair of engaging means, each engaging means is adapted in use to be received within a hole. Each joiner is preferred to have a bridge connecting the pair of engaging means.

In this embodiment, the connection means is preferred to also include an elongate sealing means adapted to run along the length of the sides of the rims of the juxtaposed receptacles respectively. Preferably, the elongate sealing means is in the form of a T-shaped member comprising horizontal and vertical elements. More preferably, when in use, the vertical element is placed intermediate the sides of the rims of the first and second receptacles whilst the horizontal element is in contact with upper surfaces of both sides.

Preferably, the bridge of each joiner includes a raised section configured in use to cover part of the T-shaped member.

Preferably, each engaging means includes a pair of legs, each leg having a detent in the form of a barb. As such, once the pair of legs is fully inserted into the corresponding holes, the barbs prevent unintended disengagement of the engaging means from the respective holes thereby enabling the bridge of each joiner to keep the elongate sealing means in place.

Preferably, the modular structure includes additional receptacles which may be attached onto the first and second receptacles to form a row or an array. Alternatively, the additional receptacles may be arranged to form an irregular structure.

Optionally, the modular structure includes a frame having a circumferential wall configured to conform to a periphery of the modular structure, the upper periphery being defined by a plurality of the outermost rims of the receptacles.

The modular structure may further include a cover pivotally and detachably attached to the bound receptacles or the frame by way of a hinge mechanism.

The hinge mechanism is preferred to consist of: one or more fastening means attached to a selected part of the periphery of the modular structure or a selected part of an upper edge of the frame; and one or more parts of the cover.

Preferably, the cover includes a support frame with a base crossbar.

The fastening means are preferred to be in the form of clips with flexible arms.

Preferably, the base crossbar is configured to be snap-fitted into the clips thereby facilitating the cover to be movably attached to the bound receptacles.

Preferably, the modular structure includes one or more of the following: an irrigation system, lighting system, supporting stands to facilitate adjustable height.

According to another aspect of the present invention, there is provided a kit of parts for building a raised garden planter bed, the kit including: at least first and second receptacles adapted to be juxtaposed; and at least one connecting means adapted to bind the juxtaposed receptacles together.

Preferably, the kit also includes a frame removably attachable to the bound receptacles, the frame being configured to increase the overall depth of the modular structure.

Preferably, the kit further includes a cover adapted to be movably attached to the bound receptacles or the frame. The cover is preferred to carry one or both of the following: an irrigation system and a lighting system.

According to a further aspect of the present invention, there is provide a method of building a raised garden planter bed, the method including the steps of: (i) providing at least first and second receptacles; (ii) juxtaposing the first and second receptacles; and (iii) binding the first and second receptacles together by way of connecting means.

Preferably, additional receptacles are provided and attached to the first and second receptacles. More preferably, the receptacles may be arranged in different manners to form garden planter beds of different shapes.

BRIEF DESCRIPTION OF SEVERAL VIEWS OF THE DRAWINGS

The invention may be better understood from the following non-limiting description of exemplary embodiments, in which.

DETAILED DESCRIPTION OF VARIOUS EMBODIMENTS

The following sets forth the invention with reference to an exemplary embodiment as illustrated in the drawings. It is to be understood, however, that this exemplary embodiment is provided by way of example only and nothing therein should be taken as a limitation upon the overall scope of the invention.

Figure 1:
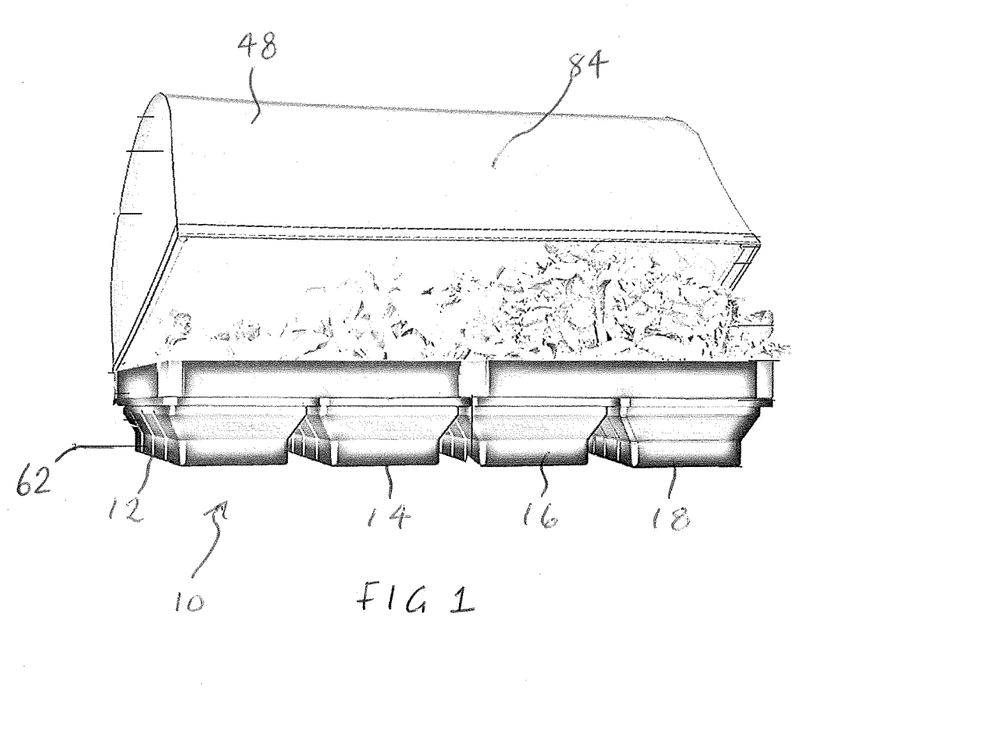
FIG. 1 is an isometric view of an assembled modular structure in accordance with an exemplary embodiment of the present invention, the modular structure being in use and comprising four identical modules in the form of receptacles, a frame and a cover.

Referring to FIG. 1, there is provided a modular structure 10 for provision of a raised garden planter bed. In this exemplary embodiment, the modular structure consists of four modules in the form of receptacles 12, 14, 16 & 18.

Figure 2:
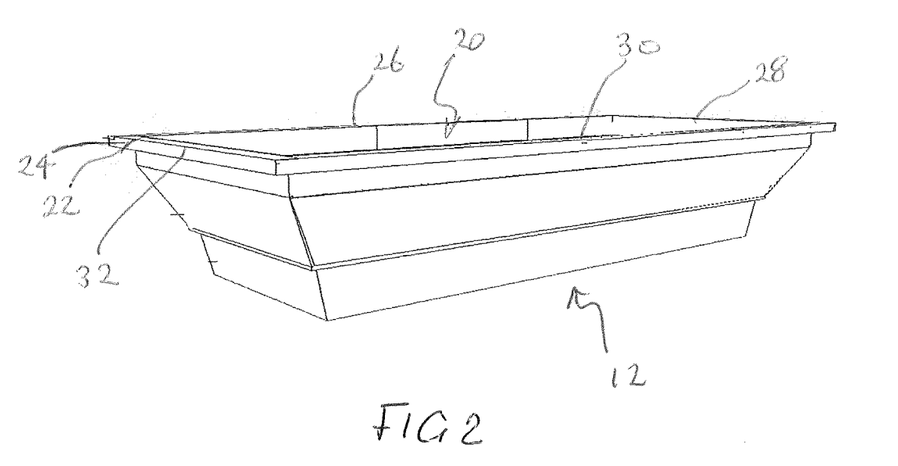
FIG. 2 is an isometric view of one of the identical receptacles of the modular structure of FIG. 1.

Turning to FIG. 2, each receptacle 12, 14, 16, 18 is a self-contained enclosure having a mouth 20 defined by a rim 22. The rim 22 has four sides 26, 28, 30 & 32 covered by a circumferential lip 24. Each receptacle 12, 14, 16, 18 is designed to contain suitable planting soil or other growing media.

Figure 3:
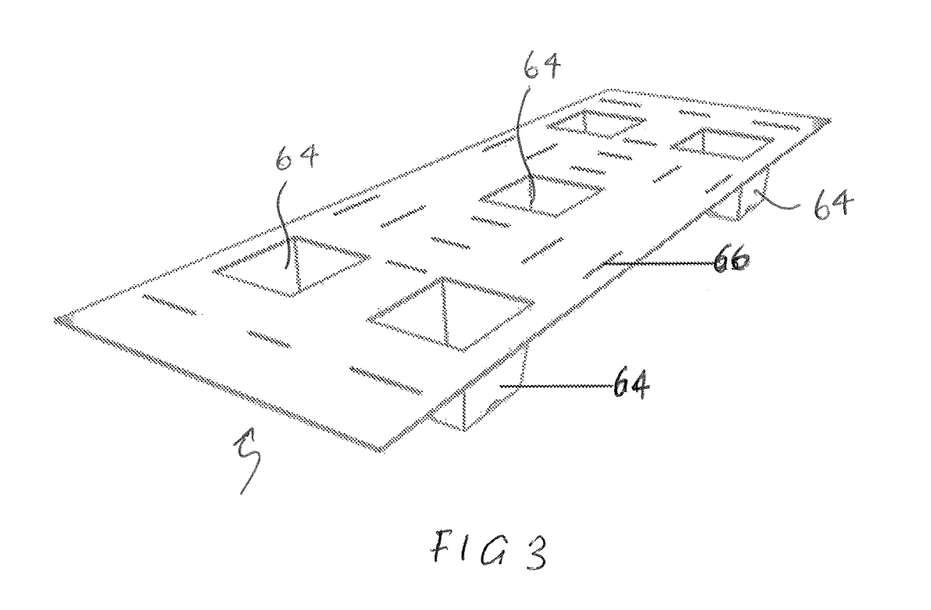
FIG. 3 is an isometric view of a tray adapted in use to be received within the receptacle of FIG. 2.

Referring to FIG. 3, a recycling tray 60 is provided and accommodated within each receptacle 12, 14. The recycling tray 60 provides a self-watering mechanism via use of a wicking system to water plants and vegetables from a reservoir 62 formed by the bottom portion of the receptacle 12, 14. As shown in FIG. 3, the tray 60 has a plurality of wells 64 which are configured to contain soil. As such, in use, the soil contained in the wells 64 is submersed in drained water retained in the bottom portion of the receptacle 12, 14. This offers the added benefit of recycling not only excess water but also the nutrients that exist in growing mediums and any fertilisers used. The tray 60 has perforations 66 which allow water to drain through into the reservoir 62 below. The wells 64 are also perforated and may contain a highly absorbent material such as perlite, vermiculite, rock wool or the like, which becomes submerged in the reservoir 62 once excess water has drained in. This operates as a capillary action to provide necessary soil moisture for ease of maintenance and water saving. The recycling tray 60 in the present embodiment is formed by a connection of a plurality of pieces fabricated from a single piece of material by for example extrusion moulding or injection moulding of plastic. Once the pieces are connected together, the recycling trays 60 becomes the top surface of the reservoir chamber 62.

Figure 4:
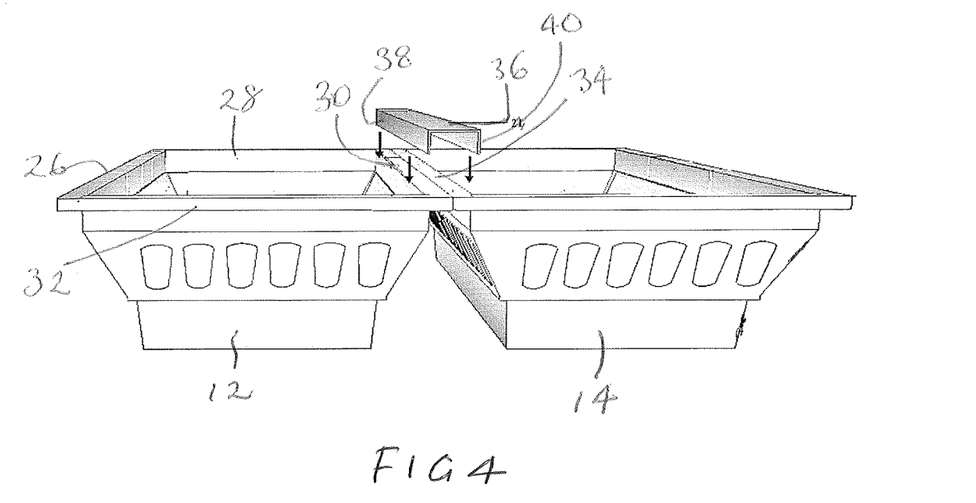
FIG. 4 is an exploded perspective view illustrating the receptacle of FIG. 2 being bound to another identical receptacle by way of one embodiment of connecting means in the form of a C-shaped channel.

As best shown in FIG. 4, receptacles 12 and 14 are used for illustrating the assembly of the module structure 10. The receptacles 12 & 14 are first juxtaposed and aligned. The side 30 abuts a corresponding side 34 of the adjacent receptacle 14. A connecting means in the form of a C-shaped channel 36 with two arms 38 & 40. During assembly, the channel 36 is brought into engagement with the receptacles 12 & 14 for the purpose of binding them together. The arm 38 of the channel 36 engages the internal surface of the side 30 of the first receptacle 12 while the other arm 40 engages internal surface of the corresponding side 34 of the second receptacle 14.

Figure 9:
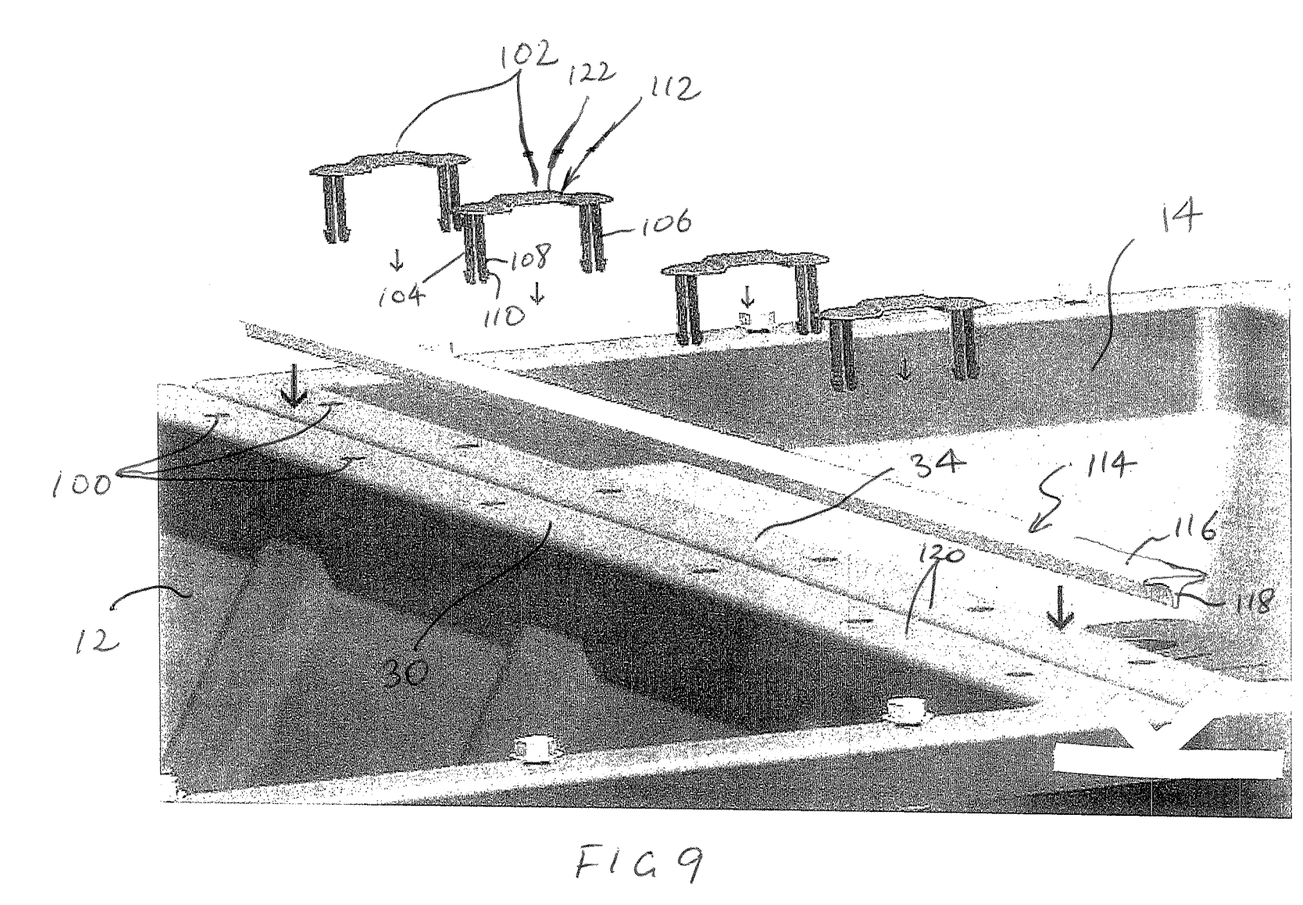
FIG. 9 is an exploded perspective view illustrating the receptacle of FIG. 2 being bound to another identical receptacle by way of another embodiment of connecting means involving an elongate T-shaped member and a plurality of joiners.

Turning to FIG. 9, another embodiment of the present invention is shown with the connecting means including holes 100 provided along opposite sides (30 and an opposite side invisible in FIG. 9) of the rim of each receptacle 12, 14 and a plurality of joiners 102 each having a pair of engaging means. Each engaging means is to be received within a corresponding hole 100. Each engaging means is in the form of a pair of legs 104, 106. Each leg 108 has a detent in the form of a barb 110. Each joiner 102 has a bridge 112 connecting two pairs of legs 104 & 106.

As shown in FIG. 9, the connection means also includes an elongate sealing means that runs along the length of the sides 30 & 34 of the rims of the juxtaposed receptacles 12 & 14, respectively. The elongate sealing means is in the form of a T-shaped member 114 with horizontal and vertical elements 116 & 118. When in use, the vertical element 116 is placed intermediate the sides 30 & 34 of the rims of the receptacles 12 & 14 whilst the horizontal element 116 is in contact with upper surfaces 120 of both sides 30 & 34. The bridge 112 of each joiner 102 has a raised section 122 configured in use to cover part of the T-shaped member 114. As such, once the pair of legs 104 & 106 is fully inserted into the corresponding holes 100, the barbs 100 would prevent unintended disengagement of the legs 104 & 106 from the holes 100 thereby enabling the bridge 112 of each joiner 102 to keep T-shaped member 114 in place.

Figure 5:
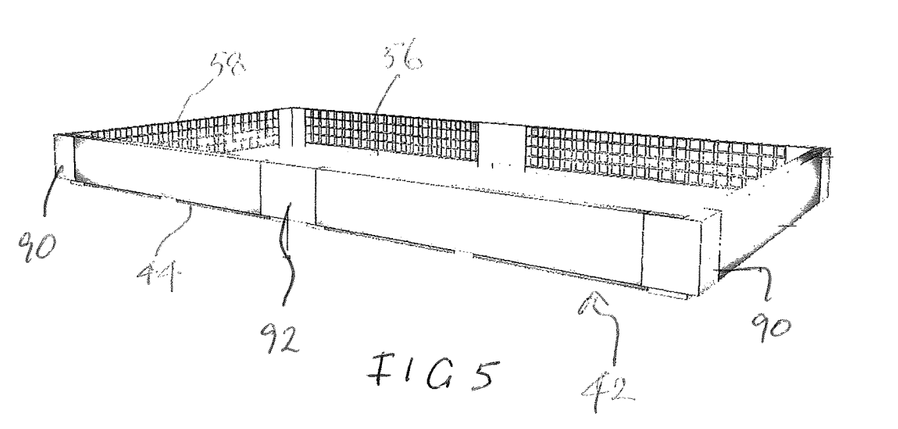
FIG. 5 is an isometric view of the frame of the modular structure of FIG. 1, the including sidewalls, straight connectors and corner members.
Figure 6:
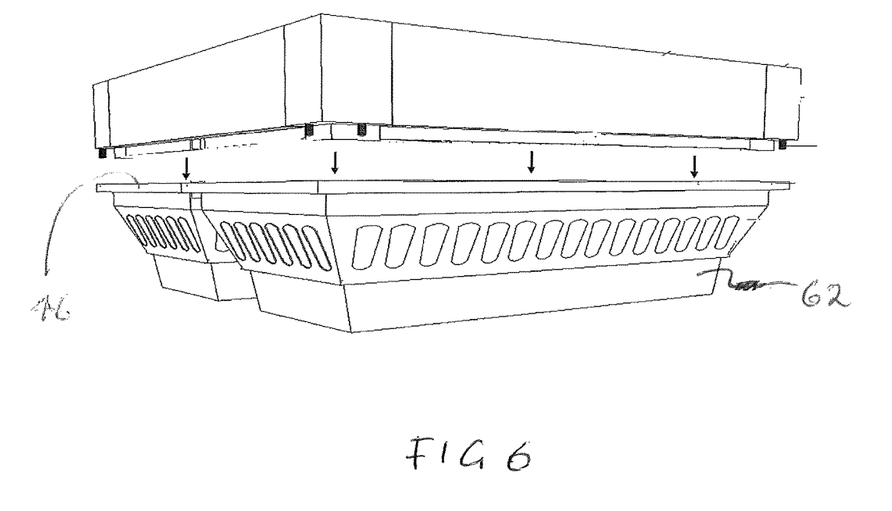
FIG. 6 is an exploded isometric view of the modular structure of FIG. 1 without the cover.

Referring to FIGS. 5 and 6, the modular structure 10 has a frame 42 having a circumferential wall 44 so configured as to conform to the periphery 46 of the modular structure 10, the periphery 46 being defined by the exposed outermost rims of the receptacles (for example, 26, 32 & 28 of receptacle 12). The frame 42 has side panels 56 & 58 (for example). The frame 42 is placed on top of the bound receptacles 12 & 14 with the side panels 56 & 58 detachably connected to the outermost rims 22 of the bound receptacles 12 & 14 in order to raise the growing depth as necessary for certain plants and vegetables.

Figure 7:
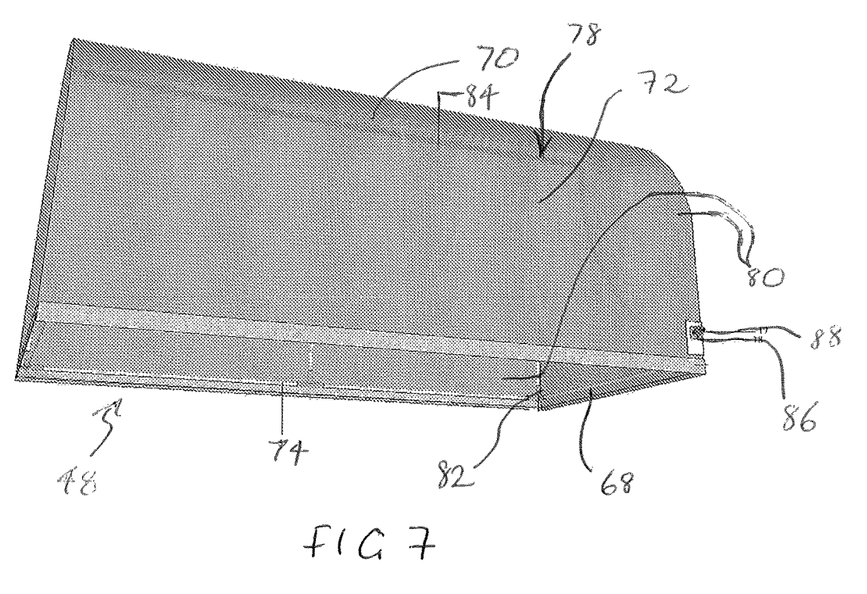
FIG. 7 is a perspective view of the cover of the modular structure of FIG. 1.

As shown in FIG. 7, the modular structure 10 of the invention has a cover pivotally and detachably attached to the frame 42 by way of a hinge mechanism. The cover, which is in the form of a hood 48, has a support frame 68 which made of steel and provided in kit form. The support frame 68 can be assembled by using the parts provided in the kit. A web or mesh of climatically suited material is mounted onto the support frame 68. The support frame 68 may then be attached either directly to the rim 22 created by the bound receptacles 14 & 16 or to the upper edge of the side panels 58, for example.

Referring to FIG. 7, the hood 48 has a rectangular base and an arching roof 70. This web or mesh 72 is made of a greenhouse material 6 which may be either porous or non-porous. The hood 48 serves the purposes of providing an enhanced growing environment and protection from inclement weather and unwanted wildlife, vermin, pests and bugs. Also, the hood 48 provides protection for plants beneath from damaging weather including hail, snow, frost, heavy rain, extreme heat, high winds, wildlife and vermin such as possums, rats, wallabies, kangaroos, deer, bandicoots, bush turkeys, birds, dogs, cats, and the majority of pests and bugs such as butterflies, moths, grubs and the like.

Figure 8:
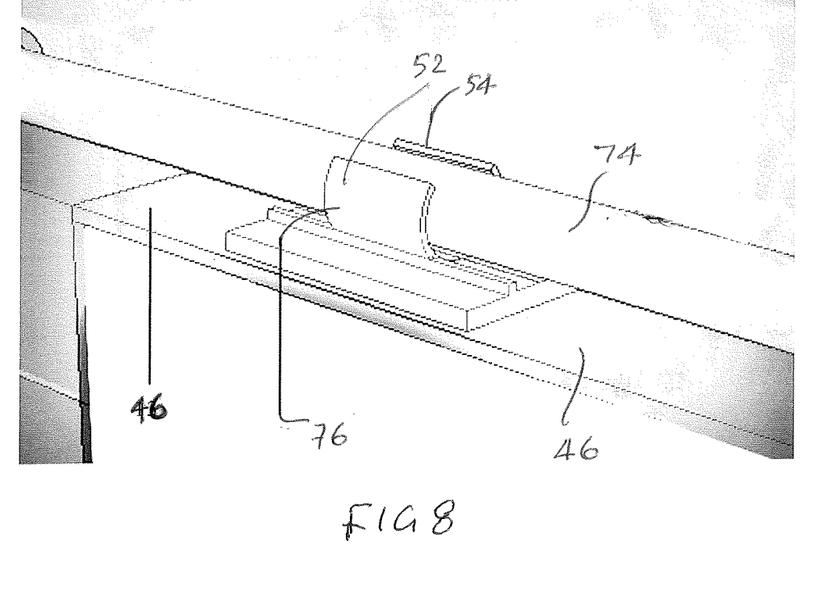
FIG. 8 is a magnified perspective view of one embodiment of a hinge mechanism including a clip and a crossbar.

Referring to FIG. 8, the support frame 68 is bound receptacles 14 & 16 or the frame 42 by way of a hinge mechanism involving part of the support frame and fastening means. The support frame 68 has a base having a crossbar 74. The crossbar 74 is movably attached to either the rim 22 formed by the bound receptacles 12 & 14 or the upper periphery 46 of the frame 42 by way of the fastening means which is in the form of C-shaped clips 76 with flexible arms 52 & 54. Each C-shaped clip 76 is formed by injection moulding from a durable UV resistant plastic which may be PE, PP or PVC. Four clips 76 are affixed to the selected parts of an upper edge 46 of the side panels, 58 for example, of the frame 42 in the present embodiment. During assembly, the crossbar 74 is snap-fitted into the clips 76. The hood 48 can then be opened from any side and clipped shut on the opposite side using the same clips 76. The hinge mechanism comprising the crossbar 74 and the clips 76 allows easy access to plants inside the module structure 10 being capable of keeping the garden planter bed closed at all other times. The cover also contains an irrigation system 78 to facilitate watering plants and vegetables inside the module structure 10. It should be noted that the support frame 68 is made of plastic coated and arched rigid steel. The support frame 68 has support members 80 which are joined with plastic connectors 82 at each junction to form an arched enclosure in the form of the hood 48 that is detachable from bound receptacles 12 & 14. The support frame 68 is covered with web 72 which is made of a fabric that is available in a plurality of textures, densities and materials dependant on climatic or prevention needs. The web 72 is stretched to over the entire support frame 68 and may be attached by various suitable methods. For example, these methods include tying a plurality of fabric or plastic-like straps around selected frame members 80 or using hook and loop fasteners.

Referring to FIGS. 1 and 7, the web 72 may be made out of any suitable materials depending upon the desired purposes such as protecting seedlings from the elements, acting as a greenhouse, acting as a cold frame to protect the bed during winter, shade etc. It also functions as a barrier to wildlife and vermin which can decimate crops entirely. With the use of an appropriate material, the web 72 can also inhibit many pests and bugs from entering the enclosure and causing damage to crops. In the present embodiment, the covering 6 serves as a greenhouse and comprises a woven plastic mesh that is permeable to air and water while providing a micro-climate that significantly enhances growth rates.

As best shown in FIG. 7, the modular structure 10 is equipped with an irrigation system which is configured to supply water to the plants to facilitate their growth. The irrigation system includes an elongate discharger 84 consisting of a soaker hose, sprinkler, drip irrigation emitters, sprays, jets, bubblers etc. The irrigation system may also include an external timer for automatically controlling the supply of water to the plants. The irrigation system further includes a hose or pipe 84 (see FIGS. 1 and 7) which extends through an aperture 86 provided in the hood 48. A hose end pipefitting or permanent coupling 88 is joined to the aperture 86 to facilitate water supply.

It is also contemplated that the arched support members 80 of the hood 48 can also be used to support a lighting system (not shown) for facilitating indoor use of the garden planter bed. The lighting system is preferred to have fluorescent light bulbs with a daylight spectrum.

It should be noted that each receptacle 12, 14, 16, 18 is a monolithic, self-sustaining body formed by injection or blow moulding of plastic. Each receptacle 12, 14, 16, 18 is able to perform as a garden planter bed in singular form as shown in FIG. 2. Identical receptacles may however be needed to the bound ones for modularity to form a raised garden planter bed of different sizes and configurations. The additional receptacles may be arranged in a row or an array. It is also contemplated that the additional receptacles may be placed and arranged such that the raised garden planter bed has an overall irregular structure. Each receptacle 12, 14, 16, 18 has angular walls for nesting and can be stacked inside each other for ease of transportation and handling.

Referring to FIG. 5, the side panels 56 & 58 of the frame 42 are interchangeable and generally straight along their lateral (horizontal) length, whereas corner members 90 are generally arcuate along their bodies to define corners of the enclosure. The side panels 56 & 58 and corner members 90 are connected seamlessly with substantially flush top and bottom surfaces. All of the side panels 56 & 58, straight connectors 92 and corner members 90 have integral male and female portions at their ends to facilitate connection to and disconnection from one another. The bottom edge of the side panels 56 & 58, for example, can be joined to the bound receptacles 12 & 14, for example, by way of fastening means such as screws, bolts, pins or plastic connectors 16. The frame 42 may also be placed directly onto the ground with pegs for affixing the frame 42 to the earth. The modular design of the side panels 56 & 58, for example, and connectors 90 & 92, for example, has the advantage of ease of transportation and handling of individual dismantled pieces, in contrast to the monolithic enclosure. In addition, the shape and size of the modular frame 42 can be easily changed by an at-home gardener by simply adding additional side panels and connectors. Being substantially rectangular in shape, each of the pieces as an individual module is a self-sustaining body that is unitarily formed from a single piece of material by, for example, extrusion moulding or injection moulding of plastic.

In use, the first receptacle 12 (refer to FIG. 2) is placed on the ground with the bottom surface in contact with the ground. Note that it can also be raised off the ground by way of a stand (not shown). Additional receptacles 14, 16 & 18 are then aligned in the manner illustrated in FIG. 4. The receptacles 12, 14, 16, 18 are then joined to one another by way of C-shaped channels 36 to produce a larger garden planter bed. Optionally, one or more frames 42 may be built onto and supported by the bound receptacles. The side panels 56 & 58 of the frame(s) 42 would result in raised growing depth thereby providing a large, deep garden bed (see FIG. 1). Soil (including fertilizer and/or compost, as applicable) can also be added to the interior space of the enclosure. The seeds, seedlings, or plants 10 can then be buried in the soil, as would be done to a traditional garden. Stakes may be placed in the soil next to the plants for support. The garden bed may also be mulched to reduce evaporation.

Referring to FIG. 1, the hood 48 can then be attached to the bound receptacles 12, 14, 16 and 18. It should be noted that more than one hood may be used depending on the final size and configuration of the assembled module structure. As described above, the hood 48 is attached to the frame 48 by pushing and snap-fitting the crossbar 74 into the clips 76. The hood 48 may be held closed by the same method on the parallel side. The irrigation system 78 may then be connected by the coupling of the watering apparatus to the coupling 88 from outside of the enclosure. This hinge mechanism provides easy access to plants and vegetables allowing the hood 48 to be easily opened from one side in excess of 100 degrees while the opposite side remains fixed with the hinges so that the garden bed and plants therein may be completely exposed as desired. The hood is made out of a material that is permeable to air making the growing internal environment more conducive to all climates.

It will be appreciated that a number of accessories may be provided with the kit or utilized with the module structure 10. For example, a weed barrier or weed block fabric (that still allows drainage) can be added on top of the recycling trays 60 to prevent soil entering the reservoir 62 underneath. Other accessories include stands to raise the height of the garden bed for elderly or incapacitated individuals providing easy access for wheelchairs. These stands include either support legs attached to the trays or a composition of flat panels vertically placed on their sides for support of the receptacle. Furthermore, it will be appreciated that the modular structure or kit can also include a variety of hand garden tools, trellises, lighting and additional irrigation systems.

It should be noted that although the modular structure of the present invention is made up of two or more module receptacles, the assembled structure is intended to appear as one unified garden once planting is completed.

Now that various embodiments of the present invention has been described in some detail, it will be apparent to a skilled person in the art that the modular structure of the present invention may offer at least the following non-limiting advantages: it allows the user to form a garden planter bed of different sizes and dimensions by adding and joining of modules; it enables easy transportation due to its modularity; it is simple to assemble and use; and it provides a more sturdy and durable solution that completely contains the soil in a garden bed rather than just providing a raised wall.

It should also be noted that the present invention utilises a material which not only protects plants and vegetables from damage but also provides a micro-climate that can be managed by the user. This micro-climate enhances growth rates substantially.

Those skilled in the art will appreciate that the invention described herein is susceptible to variations and modifications other than those specifically described. For example, the number of receptacle modules may vary. Also, the individual modules may be arranged in different configurations so as to provide module structures of different shapes and forms. All such variations and modifications are to be considered within the scope and spirit of the present invention the nature of which is to be determined from the foregoing description.

That which is claimed:

1. A modular structure for provision of a raised garden planter bed, the structure comprising:
   at least first and second receptacles, the first and second receptacles having a plurality of outermost rims and being juxtaposed relative to one another, the plurality of outermost rims defining an outermost periphery of the first and second receptacles;
   connecting means configured to detachably bind the juxtaposed first and second receptacles together relative to one another, the connecting means comprising:
      holes provided along opposite sides of the outermost rims of each of the first and second receptacles,
      joiners each having a pair of engagement means configured, in use, to be received within a corresponding hole, and
      an elongate sealing means configured to run along a length of the sides of the plurality of outermost rims that are juxtaposed, respectively, the elongate sealing means comprising a T-shaped member comprising horizontal and vertical elements, wherein a bridge of each joiner comprises a raised section configured, in use, to cover part of the T-shaped member; and
   a collapsible frame including a plurality of detachable panels that collectively define a circumferential wall, the circumferential wall being configured to rest on top of the outermost periphery of the first and second receptacles of the modular structure so as to provide growing depth, the plurality of detachable panels including a set of linear side panels and a set of arcuate corner members, the sets of linear side panels and arcuate corner members being interconnected relative to one another with top and bottom surfaces that are aligned with and further define the outermost periphery, each arcuate corner member within the set of arcuate corner members defining a respective corner of the collapsible frame,
   wherein:
      the frame is variable according to the number and arrangement of the receptacles included in the modular structure; and
      the frame is detachably connected to the plurality of outermost rims of the receptacles.

2. The modular structure of claim 1, wherein each receptacle comprises a topless enclosure having a mouth defined by a rim.

3. The modular structure of claim 2, wherein the rim comprises a circumferential lip.

4. The modular structure of claim 2, wherein the rim comprises four sides.

5. The modular structure of claim 1, wherein each receptacle comprises a tray configured to allow water recycling.

6. The modular structure of claim 1, wherein, when in use, the vertical element is placed intermediate the sides of the rims of the first and second receptacles whilst the horizontal element is in contact with upper surfaces of both sides.

7. The modular structure of claim 1, wherein each engaging means comprises a pair of legs, each leg having a detent in the form of a barb.

8. The modular structure of claim 1, wherein the modular structure comprises additional receptacles which are attached onto the first and second receptacles to form a row or an array.

9. The modular structure of claim 1, further comprising a cover pivotally and detachably attached to at least one of the bound receptacles or the frame via a hinge mechanism.

10. The modular structure of claim 9, wherein the hinge mechanism comprises:
one or more fastening means attached to at least one of a selected part of the periphery of the modular structure or a selected part of an upper edge of the frame; and
one or more parts of the cover.

11. The modular structure of claim 10, wherein the fastening means comprise clips with flexible arms.

12. The modular structure of claim 9, wherein the cover comprises a support frame with a base crossbar.

13. The modular structure of claim 12, wherein the base crossbar is configured to be snap-fitted into the clips thereby facilitating the cover to be movably attached to the bound receptacles.

14. The modular structure of claim 1, wherein the modular structure comprises one or more of the following: an irrigation system, lighting system, supporting stands to facilitate adjustable height.

15. A kit of parts for building a raised garden planter bed, the kit comprising:
at least first and second receptacles, the first and second receptacles having a plurality of outermost rims and being juxtaposed relative to one another, the plurality of outermost rims defining an outermost periphery of the first and second receptacles;
connecting means configured to detachably bind the juxtaposed first and second receptacles together relative to one another, the connecting means comprising:
holes provided along opposite sides of the outermost rims of each of the first and second receptacles,
joiners each having a pair of engagement means configured, in use, to be received within a corresponding hole, and
an elongate sealing means configured to run along a length of the sides of the plurality of outermost rims that are juxtaposed, respectively, the elongate sealing means comprising a T-shaped member comprising horizontal and vertical elements, wherein a bridge of each joiner comprises a raised section configured, in use, to cover part of the T-shaped member; and
a collapsible frame including a plurality of detachable panels that collectively define a circumferential wall, the circumferential wall being configured to rest on top of the outermost periphery of the first and second receptacles of the modular structure so as to provide growing depth, the plurality of detachable panels including a set of linear side panels and a set of arcuate corner members, the sets of linear side panels and arcuate corner members being interconnected relative to one another with top and bottom surfaces that are aligned with and further define the outermost periphery, each arcuate corner member within the set of arcuate corner members defining a respective corner of the collapsible frame,
wherein:
the frame is variable according to the number and arrangement of the receptacles included in the modular structure; and
the frame is detachably connected to the plurality of outermost rims of the receptacles.

16. The kit of parts of claim 15, wherein the frame is configured to increase the overall depth of the modular structure.

17. The kit of parts of claim 15, further comprising a cover configured to be movably attached to at least one of the bound receptacles or the frame.

18. The kit of parts of claim 17, wherein the cover carries one or both of the following: an irrigation system and a lighting system.

19. A method of building a raised garden planter bed, the method including the steps of:
(i) providing at least first and second receptacles having a plurality of outermost rims, the plurality of outermost rims defining an outermost periphery of the first and second receptacles;
(ii) juxtaposing the first and second receptacles relative to one another;
(iii) detachably binding the first and second receptacles together and relative to one another by way of connecting means, the connecting means comprising:
holes provided along opposite sides of the outermost rims of each of the first and second receptacles,
joiners each having a pair of engagement means configured, in use, to be received within a corresponding hole, and
an elongate sealing means configured to run along a length of the sides of the plurality of outermost rims that are juxtaposed, respectively, the elongate sealing means comprising a T-shaped member comprising horizontal and vertical elements, wherein a bridge of each joiner comprises a raised section configured, in use, to cover part of the T-shaped member; and
(iv) detachably connecting a collapsible frame to the plurality of outermost rims of the at least first and second receptacles, wherein:
(a) the collapsible frame includes a plurality of detachable panels that collectively define a circumferential wall, the circumferential wall being configured to rest on top of the outermost periphery of the first and second receptacles of the modular structure so as to provide growing depth, the plurality of detachable panels including a set of linear side panels and a set of arcuate corner members, the sets of linear side panels and arcuate corner members being interconnected relative to one another with top and bottom surfaces that are aligned with and further define the outermost periphery, each arcuate corner member within the set of arcuate corner members defining a respective corner of the collapsible frame; and (b) the frame is variable in size according to the number and arrangement of the receptacles included in the raised garden planter bed.

20. The method of claim 19, wherein additional receptacles are provided and attached to the first and second receptacles.

21. The method of claim 20, wherein all of the receptacles are configured for arrangement in different manners to form garden planter beds of different shapes.

* * * * *